United States Patent [19]

Reavely et al.

[11] Patent Number: 4,621,980
[45] Date of Patent: Nov. 11, 1986

[54] FIBER REINFORCED COMPOSITE SPAR FOR A ROTARY WING AIRCRAFT

[75] Inventors: Richard T. Reavely, Madison; David N. Schmaling, Oxford, both of Conn.

[73] Assignee: United Technologies Corporation, Hartford, Conn.

[21] Appl. No.: 652,029

[22] Filed: Sep. 19, 1984

[51] Int. Cl.$^4$ .............................................. B63H 1/20
[52] U.S. Cl. ..................................... 416/226; 416/230; 428/36; 428/105; 428/113; 428/408; 428/413; 428/902
[58] Field of Search ................. 428/36, 377, 408, 284, 428/287, 298, 113, 105, 246, 902, 413; 156/172, 173, 175, 166, 169; 416/226, 230

[56] References Cited

U.S. PATENT DOCUMENTS

| | | | |
|---|---|---|---|
| 3,713,753 | 1/1973 | Brunsch | 416/230 |
| 3,768,760 | 10/1973 | Jensen | 244/123 |
| 4,242,160 | 12/1980 | Pinter et al. | 416/226 |
| 4,255,087 | 3/1981 | Wackerle | 416/230 |
| 4,255,478 | 3/1981 | Crane | 416/230 |
| 4,273,601 | 6/1981 | Weingart | 156/189 |
| 4,404,053 | 9/1983 | Saffire | 156/173 |
| 4,452,658 | 6/1984 | Schramm | 416/226 |

*Primary Examiner*—James J. Bell
*Attorney, Agent, or Firm*—Alan C. Cohen

[57] ABSTRACT

The present invention discloses a damage tolerant composite article comprising a plurality of layers of both graphite and polyaramide fibers. The graphite fiber layers are oriented at angles of about ±30° and about ±15° to the longitudinal axis while the polyaramide fiber layers are oriented at about ±14° to the longitudinal axis. Composite structures of this construction will have increased damage tolerance while maintaining the required bending and torsional stiffness.

4 Claims, 1 Drawing Figure

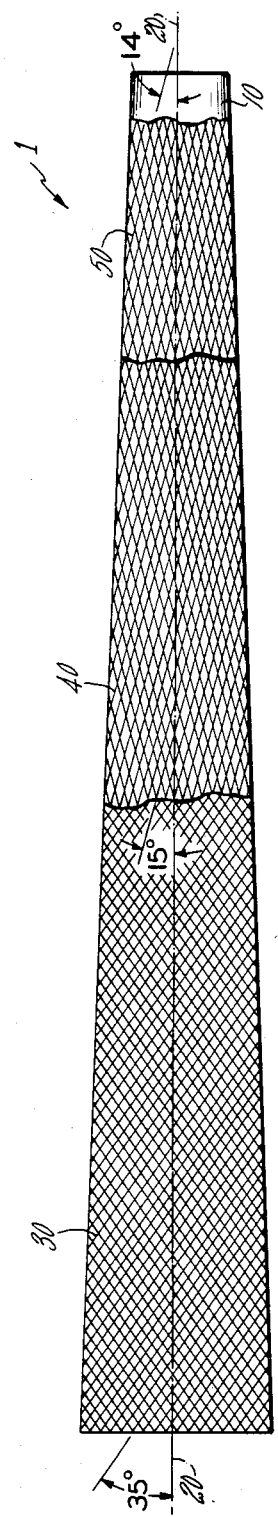

FIBER REINFORCED COMPOSITE SPAR FOR A ROTARY WING AIRCRAFT

The Government has rights in this invention pursuant to Contract No. DAAK51-81-C-0014 awarded by the Department of the Army.

DESCRIPTION

1. Technical Field

The field of art to which this invention relates is fiber reinforced resin matrix composites, more particularly to composite tubular structures.

2. Background Art

Composite materials are becoming used more and more in areas where damage tolerance is required. Of particular concern is in helicopter rotors, blades and other critical components which, having undergone severe damage, can cause total failure of the system and collapse of the aircraft. It is known that by interleaving a fiber material which has greater axial strain capability or elasticity into one of these composite articles that the damage tolerance is increased. However, typically, these high strain, axial fibers have lower stiffness than the other high tensile strength fibers. Therefore, when introduced into such composite articles they reduce the stiffness of such articles. In order to compensate for the loss of stiffness and still maintain the improved damage tolerance which is accorded by these high axial strength fibers, one could increase the amount of stiff fiber layers in the composite article. However, this will cause an increase in weight as well as cost of the article, both of which are important drawbacks to the aircraft industry. When adding extra layers into a tubular structure whose outside geometry is fixed, the extra layers are added to the inside. Each layer of the composite structure effects the overall stiffness of the components as a function of the square of the distance from the center or neutral axis. Because of this, the effect of adding additional layers rapidly diminishes with each layer added, thus compounding the cost/weight problem.

Up to now the introduction of up to about 25% by weight of the high axial strength fibers into a composite article, such as a helicopter rotor blade spar has not proven to be too detrimental. However, higher percentages than this have required an increase in the thickness-to-chord ratio in order to achieve the bending and torsional stiffness required to maintain aeroelastic stability. Increasing the thickness-to-chord ratio, and hence the airfoil thickness, has the effect of spreading the layers forming the spar further out from the center and therefore more effective in bending and torsional stiffness. The disadvantage, however, is that the increased thickness increases the drag on the blade, and complicates the tooling and manufacture when a tapered thickness is used to decrease the drag penalty.

Therefore, since it is known that even greater quantities of this fiber will increase the damage tolerance of these structures, a method of fabricating these structures with the same stiffness but with an increase in the high axial strain fibers is required.

DISCLOSURE OF INVENTION

The present invention is directed toward a fiber reinforced resin composite structure having a plurality of layers of both graphite and polyaramide fibers. The fibers are oriented from about ±30° to about ±40° and ±12° to about ±16° to the longitudinal axis.

The fiber orientations allow for the introduction of a higher percentage of polyaramide matrix into the structure, increasing its damage tolerance, while maintaining the torsional and bending stiffness.

Other features and advantages will be apparent from the specification and claims and from the accompanying drawings which illustrate an embodiment of the invention.

BRIEF DESCRIPTION OF DRAWING

The FIGURE depicts a composite spar of the present invention.

BEST MODE FOR CARRYING OUT THE INVENTION

Referring now to Figure which is exemplary and is not meant to be limiting.

The fiber reinforced resin matrix composite spar 1 is comprised of 17 layers of graphite and polyaramide fibers. The graphite fiber layers are oriented at angles of about ±35° or about ±15° to the longitudinal axis 20. The angle orientation of the particular layer being dependent on the particular function which that layer is to perform within the structure. The ±35° layers impart increased torsional stiffness to the entire structure while offering a certain amount of axial stiffness as well, while the ±15° graphite layers increase the axial stiffness sufficiently, to allow introduction of an increased amount of axially and torsionally softer material such as a polyaramide, while still maintaining the same overall physical properties as a titanium spar. However this increased amount of polyaramide fibers offers a desirable increase in the damage tolerance of the spar.

Typically the graphite layers are formed of conventional graphite roving or fibers. These fibers generally have a tensile strength of about 400,000 psi to about 600,000 psi and may range in cross-section from about 0.00025 inch to about 0.00030 inch. This roving typically comprises about 12,000 fibers and is ideal for use with filament winding machines. The preferred graphite fibers are Celion and are available from the Celanese Corporation and may be purchased unimpregnated or preimpregnated with the resin matrix. It is preferred that the fiber or roving be preimpregnated as the resulting structure will be more uniform in resin distribution. Other conventional graphite fibers which may be used are T-300 available from Union Carbide Corporation and AS-4 available from Hercules Corporation.

The polyaramide layers have the fibers oriented at about ±14° to the longitudinal axis as this offers superior axial stiffness compatible with the manufacturing process while maintaining its contribution of damage tolerance to the spar. As with the graphite fibers, the polyaramide fibers which may be used to practice this invention are any of the conventional polyaramide fibers. These fibers may be in the form of monofilament or roving with the preferred form being the roving. Typically these rovings have a tensile strength of about 525,000 psi and may be purchased either impregnated or unimpregnated with the resin matrix material. Again, the preimpregnated form is preferred. The preferred material is a polyaramide fiber available from Dupont Corporation called Kevlar ® and is identified as Kevlar-49.

The resin matrix material which is useful in producing these structures is epoxy resins such as E-7-K8 which is commercialy available from U.S. Polymeric.

However any number of epoxy resin systems may be used such as 5225.

Generally the spar is formed about a removable mandrel. For ease of application and for a more uniform final structure the rovings of both graphite and polyaramide are preimpregnated with the resin prior to winding. Although winding is the preferred technique, other techniques may be used to wrap the fibers about the mandrel. Each layer of fiber is formed by winding the preimpregnated yarn about the mandrel at the desired angle resulting in a continuous fiber or yarn throughout the entire layer. The orientation of the fibers of each layer and the composition of a given layer will depend on the desired physical properties in the final article. The thickness of each layer will vary with the thickness of the yarn, however, typically these layers will be about 0.020 inch thick.

The particular placement of one type of layer in relationship to another will depend on what properties are desired in the structure.

It is the unique fiber orientation of the graphite fiber layers and the polyaramide fiber layers that allow the composite structures to have this increase in the polyaramide fiber content, thus increasing the damage tolerance of the structure while maintaining predetermined physical parameters such as overall stiffness, weight and geometry. In similar articles, other combinations of numbers of layers and their position in the article may be varied to attain the desired results. However, for greatest damage tolerance it is desirable to maximize the polyaramide fiber content of the structure in the direction of the principal loading.

EXAMPLE

A fiber reinforced resin matrix composite spar weighing approximately 98 pounds was formed as follows.

Referring now to the FIGURE. The spar was formed by winding layers of fibers of both graphite and Kevlar ® about a mandrel 10. The spar comprised 17 layers of fibers of which layers 1, 4, 7, 10, 13 and 17 comprised Celion graphite fibers available from Celanese Corporation, New York, N.Y., impregnated with about 25 percent by weight of E-7-K8 epoxy resin from U.S. Polymeric Corporation. The fiber orientation in these layers 30 was about ±35° to the longitudinal axis 20. The same graphite fibers and resin system were used to form layers 2, 3 and 16, identified by the number 40 in the FIGURE, which had the fiber orientation at about ±15° to the longitudinal axis 20.

The remaining layers 5, 6, 8, 9, 11, 12 14 and 15, identified by the number 50 in the FIGURE, comprise Kevlar ® polyaramide fibers commerically available from DuPont as Kevlar-49. These fibers were also pre-impregnated with the same epoxy system and with the same amount as the graphite fibers. These layers were wound, such that their fiber angle was about ±14° to the longitudinal axis of the spar 20.

All of the layers were wound on the mandrel using a conventional filament winding machine available from McLean-Anderson, and were about 0.020 inch thick; the resulting spar was about ½ inch thick. The uncured spar was then cured in the conventional manner.

This invention offers a solution to the construction of composite articles which are required to have a high degree of damage tolerance but must also be stiff and lightweight. In order to achieve the required bending and torsional stiffness, fiber angles of about ±35° and ±15° were used, the ±35° angle layers used predominantly for torsional stiffness, and the ±15° layers used predominantly for axial or bending stiffness. The angle of ±35° was chosen for the torsion stiffness layers instead of the more usual ±45° because, although suffering a slight loss in torsional stiffness, it nearly doubled the axial stiffness for that layer, thus reducing the number of high stiffness axial (±15°) layers required. This allowed a corresponding increase in the number of axial polyaramide fiber layers. The primary structural requirement of a damaged helicopter rotor blade is that it sustain the loading from centrifugal force on the outboard section of the blade. For this reason, the polyaramide fibers are at 14° only (not 35°), which are more effective in reacting axial loading. By being able to introduce a significantly higher amount of the polyaramide fibers into the structure without sufficient weight, size or cost penalties, the resulting blade is safer and more reliable.

It should be understood that the invention is not limited to the particular embodiments shown and described herein, but that various changes and modifications may be made without departing from the spirit and scope of this novel concept as defined by the following claims.

We claim:

1. A composite spar for a rotary wing aircraft blade comprising:

a plurality of layers of graphite and polyaramide fibers wherein the layers of graphite fibers are oriented at about ±30° to about ±40° and about ±12° to about ±16° to the longitudinal axis of the structure and the polyaramide fibers are oriented at about ±12° to about ±16° to the longitudinal axis and said matrix is a thermosetting resin, wherein the concentration of polyaramide fibers is greater than 25 percent by weight.

2. A composite spar for a rotary wing aircraft blade comprising:

a plurality of alternating layers of graphite and polyaramide fibers wound about a central axis, wherein the graphite fiber layers are oriented from about ±30° to about ±40° and from about ±10° to about ±20° and the polyaramide fibers are oriented from about ±12° to about ±16° to a longitudinal axis and said matrix is a thermosetting resin.

3. The article of claim 1 having 17 layers of fiber reinforcement wherein layers 1, 4, 7, 10, 13 and 17 comprise graphite fibers oriented at about ±35° to the longitudinal axis, layers 2, 3 and 16 comprise graphite fibers oriented at about ±15° to the longitudinal axis and layers 5, 6, 8, 9, 11, 12, 14 and 15 comprise polyaramide fibers oriented at about ±14° to the longitudinal axis.

4. The article of claim 2 wherein the matrix material comprises about 40 percent to about 60 percent by volume of a thermosetting epoxy.

* * * * *